United States Patent [19]

Röck et al.

[11] Patent Number: 4,802,716

[45] Date of Patent: Feb. 7, 1989

[54] FITTING ASSEMBLY FOR CONNECTING THE SIDEWALL OF A DRAWER TO THE REAR WALL THEREOF

[75] Inventors: Erich Röck, Höchst; Helmut Hollenstein, Lustenau; Josef Brunner, Höchst, all of Austria

[73] Assignee: Julius Blum Gesellschaft m.b.H., Höchst, Austria

[21] Appl. No.: 46,175

[22] Filed: May 5, 1987

[30] Foreign Application Priority Data

May 14, 1986 [AT] Austria ................................ 1280/86

[51] Int. Cl.<sup>4</sup> ............................................. A47B 88/00

[52] U.S. Cl. ................................. 312/330 R; 312/263; 403/316

[58] Field of Search ............... 312/330 R, 257 R, 263; 403/254, 255, 316; 220/4 F

[56] References Cited

U.S. PATENT DOCUMENTS

| | | | |
|---|---|---|---|
| 2,701,174 | 2/1955 | Franks | 312/330 R X |
| 3,610,719 | 10/1971 | Alston | 312/330 X |
| 4,324,172 | 4/1982 | Cazals et al. | 220/4 F X |

FOREIGN PATENT DOCUMENTS

| | | | |
|---|---|---|---|
| 2237490 | 7/1979 | Fed. Rep. of Germany | 403/255 |
| 639252 | 11/1983 | Switzerland | 312/330 R |

*Primary Examiner*—Joseph Falk
*Attorney, Agent, or Firm*—Wenderoth, Lind & Ponack

[57] ABSTRACT

A fitting for a drawer which can be assembled from a plurality of components and has metal drawer sides includes fasteners for connecting the drawer sides to a rear wall of the drawer. Each drawer side is provided with an angled fastening plate for connection to the rear wall of the drawer. The fastening plate has therein a keyhole and on the upper edge a slot which is open at the top and into which holding members of the rear wall of the drawer can be inserted. In addition, the fastening plate is provided with additional holes for fastening screws or tenons. The holding members of the rear wall of the drawer are plates each of which has a positioning web projecting into the open slot and a nose projecting into the keyhole.

13 Claims, 8 Drawing Sheets

FITTING ASSEMBLY FOR CONNECTING THE SIDEWALL OF A DRAWER TO THE REAR WALL THEREOF

BACKGROUND OF THE INVENTION

The present invention relates to a fitting for a drawer which can be assembled from a plurality of components and has metal drawer sides which at the same time form pull-out rails for extracting the drawer and which comprise fastening means for a front panel and a rear wall of the drawer, each drawer side having an angled fastening plate for the rear wall of the drawer.

In addition to drawers which are produced in one piece, in particular drawers of plastics material, drawers still predominantly used are assembled from a plurality of parts.

These drawers are generally provided with fittings which are part of the pull-out guide mounting and which facilitate the extraction and insertion of the drawer from and into the piece of furniture respectively.

In addition, modern drawers of this type comprise a front plate holding means which makes it possible to adjust the position of the front panel, in order to correct the alignment of the drawer relative to the joints and the front plane of the piece of furniture after the drawer has been inserted therein.

According to the known state of the art the assembly of drawers of this type represents a considerable outlay in terms of manufacturing costs, and this underlies the partial preference for drawers produced in one piece. It should be pointed out, however, that, particularly where large drawers intended to receive heavy loads are involved, one-piece drawers can be used only to a limited extent. In addition, such drawers are possible only with large-scale mass production, since centers of mass for the piece of furniture to be produced have already been determined with the established dimensions of the drawer.

SUMMARY OF THE INVENTION

The object of the invention is to provide a fitting for various types of fastenings for the rear wall of the drawer, so that, depending upon the price range in which the drawer to be produced is offered, different possibilities of assembling the rear wall are provided.

This is attained according to the invention in that the fastening plate has therein a keyhole and on the upper edge a slot which is open at the top and into which holding members of the rear wall of the drawer can be inserted, and the fastening plate also includes additional holes for fastening screws and/or carry tenons or dowels.

BRIEF DESCRIPTION OF THE DRAWINGS

Various embodiments of fittings according to the invention are described below with reference to the accompanying drawings, in which.

DETAILED DESCRIPTION OF THE INVENTION

Figure 1:
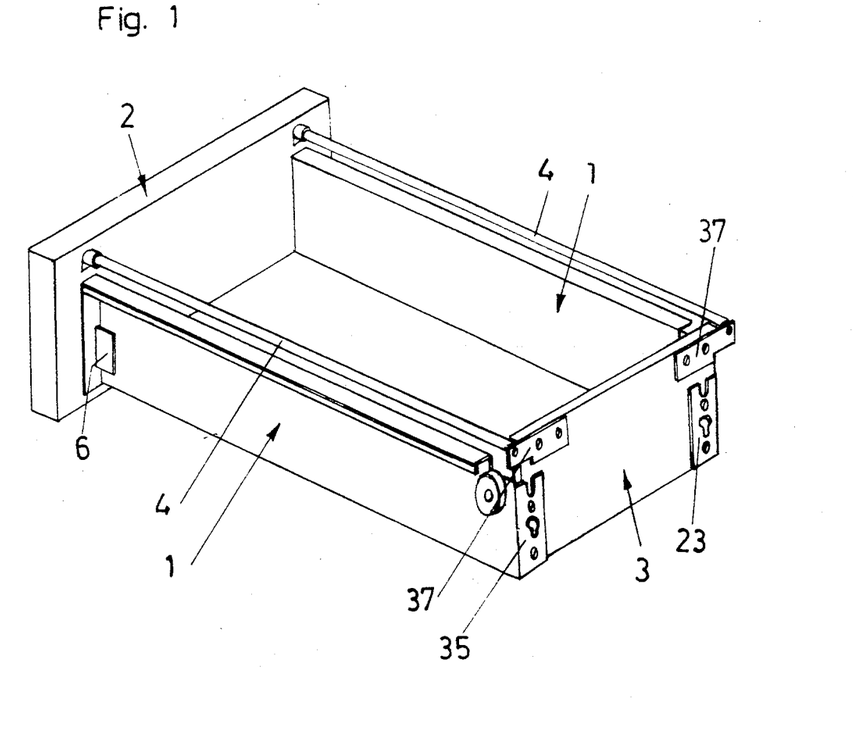
FIG. 1 is a perspective view of a drawer with fittings according to the invention.
Figure 2:
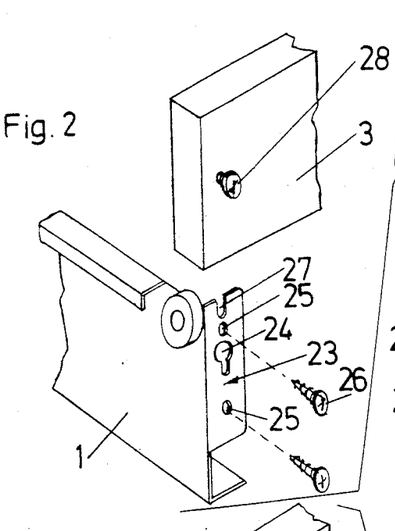
FIGS. 2 to 4 are perspective views of corner connection between the drawer side and the rear wall of the drawer.

The essential parts of the drawer are two drawer sides or side walls 1, front panel 2, rear wall 3 and, where appropriate, a rail 4 on each side.

FIGS. 2 to 9 illustrate various embodiments of structure for fastening the rear wall 3 of the drawer to each drawer side 1.

Each drawer side 1 is provided at the rear with a fastening plate 23. Fastening plate 23 extends at a right angle to the drawer side 1 and is provided with a keyhole 24 and two fastening holes 25 for screws 26. The upper edge of the fastening plate 23 has therein an open slot 27. In the embodiment according to FIG. 2 the rear wall 3 of the drawer carries a fastening bolt or screw 28, can be inserted in the keyhole 24 to thus support rear wall 3. The rear wall 3 of the drawer can then be securely joined to the drawer side 1 either by simply tightening the fastening bolt 28 or by additionally screwing in the screws 26.

Figure 3:
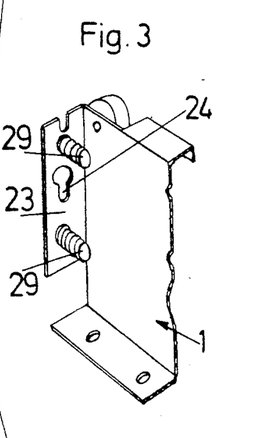
Figure 4:
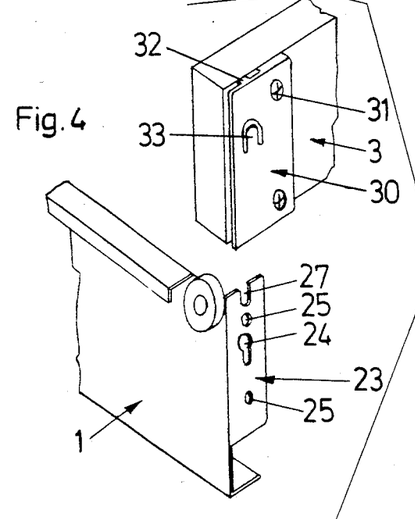
Figure 5:
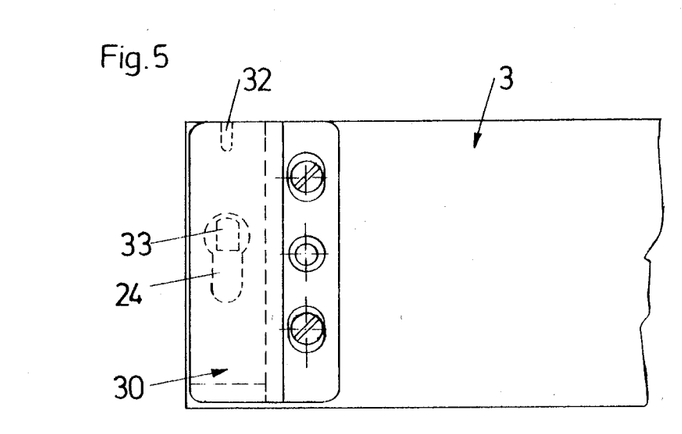
FIG. 5 is an end elevation of the corner connection.
Figure 6:
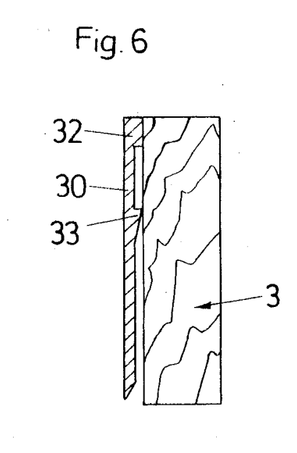
FIG. 6 is a section through the rear wall of the drawer with a holding member secured thereto.
Figure 7:
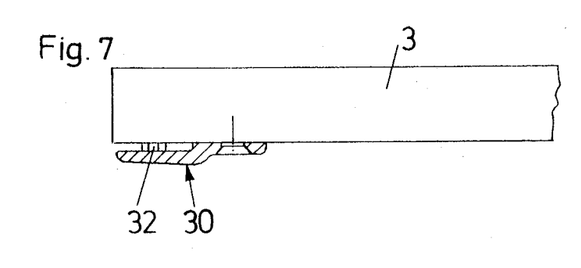
FIG. 7 is a plan view of a corner of the rear wall of the drawer with a holding member secured thereto.

In the embodiment according to FIG. 3, tenons 29, which are to be inserted in corresponding bores in the rear wall 3 of the drawer, are attached to plate 23 in place of the fastening holes 25.

In the embodiment according to FIGS. 4 to 7, a plate 30 is secured to the respective end of rear wall 3 of the drawer, for example by means of screws 31. The plate 30 includes a positioning web or tab 32, which is insertible in the slot 27 of plate 23. Plate 30 also is provided with a nose 33 which, when the plate 30 is pushed from above onto the fastening plate 23, projects into the keyhole 24 and snaps therein. The rear wall 3 of the drawer is thus fixed on the fastening plates 23 on the drawer sides 1 by simply pushing the rear wall downwardly on the plates 23.

Figure 8:
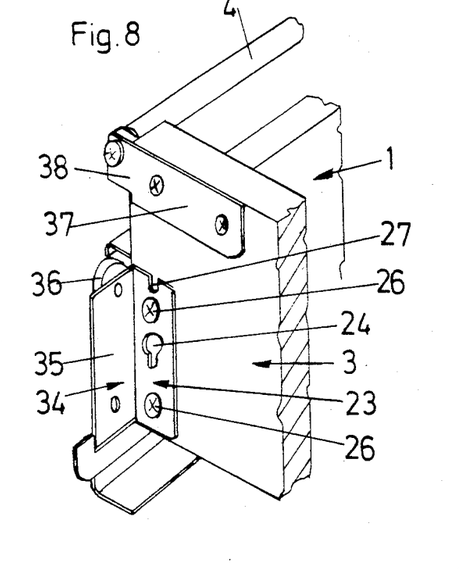
FIGS. 8 and 9 are further perspective views of two corner connections between the drawer side and the rear wall of the drawer.
Figure 9:
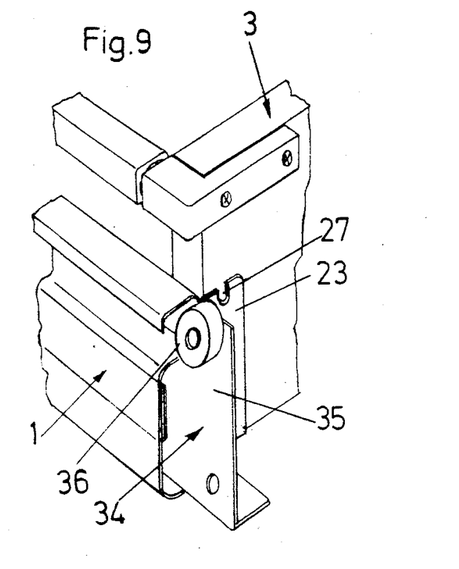

In the embodiment according to FIGS. 8 and 9, each fastening plates 23 is part of a separate steel component 34 which is rivetted or otherwise secured to the drawer side 1. In this connection the drawer sides 1 are preferably made of aluminum and, as shown in FIG. 9, are of double wall construction. Part 34 is a steel component which can absorb substantial stresses. In this embodiment the fastening plate 23 is formed with an angle member 35, which carries the roller 36 of the drawer.

In these embodiments the rear wall 3 of the drawer is provided with holding means for drawer rails 4. In this connection each holding means is, as shown in FIG. 8, a plate 37 which is screwed onto the rear wall 3 of the drawer and which comprise a lug or part 38 which projects beyond the rear wall 3 of the drawer and which is provided with an open slot 39 (FIG. 10) in which the rail 4 can be hung. The rail 4 can be fixed by means of a screw or the like.

As shown in FIGS. 8 and 10 to 14, the plates 37 can have various shapes and can be adapted to particular requirements.

Figures 10, 11, 12, 13, 14:
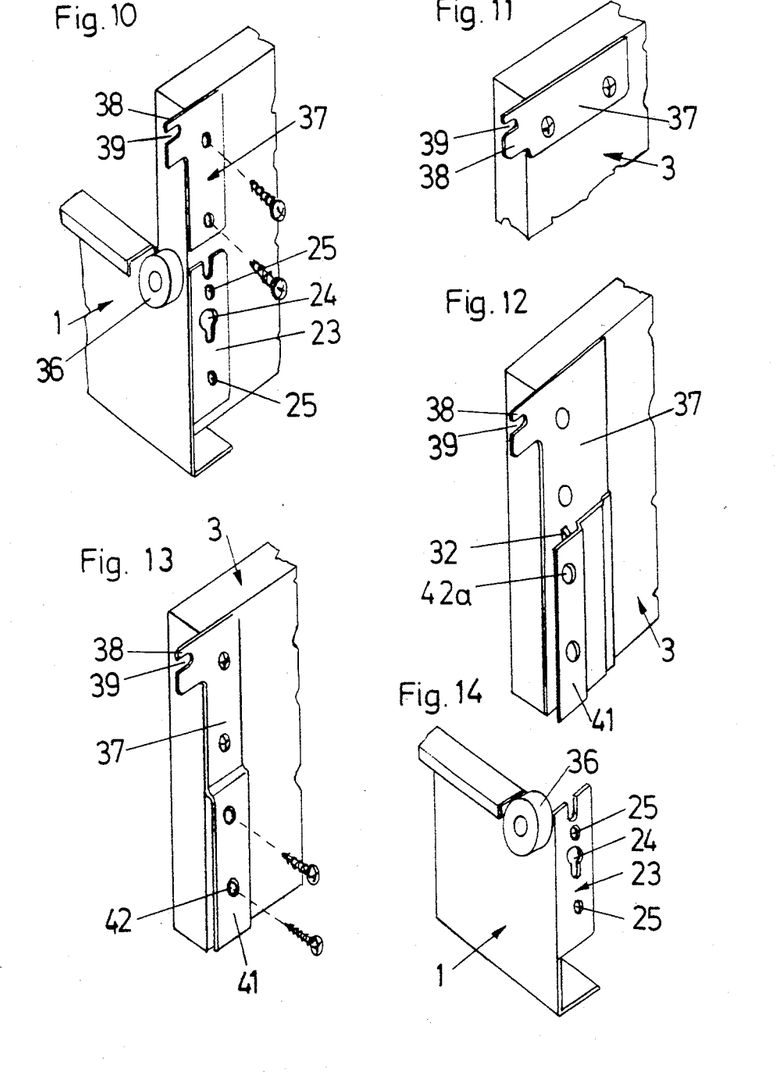
FIGS. 10 to 13 are perspective views various fittings on the rear wall of the drawer.
FIG. 14 is a perspective view of a drawer side with a fastening plate for the rear wall of the drawer.

In the embodiment according to FIG. 13, the plate 37 is provided with an outwardly stepped extension 41 which can be pushed over the fastening plate 23. The extension 41 has therein fastening holes 42 which correspond to the holes 25 in the plate 23. The screws 26 can then be screwed into the rear wall 3 of the drawer through the holes 42 and 25 to thus fasten the rear wall 3 of the drawer to the fastening plate 23.

In, the embodiment according to FIG. 12, plate 37 has an outwardly spaced place 41 which can be fit over plate 23 and which has holes 41a to align with holes 25 so that fastening of screws 26 will clamp plates 41 and 23 against rear wall 3. The plate 41 is provided at a top with the positioning web 32, similar to that of the embodiment of FIG. 4, to fit in slot 27 in plate 23.

Figure 15:
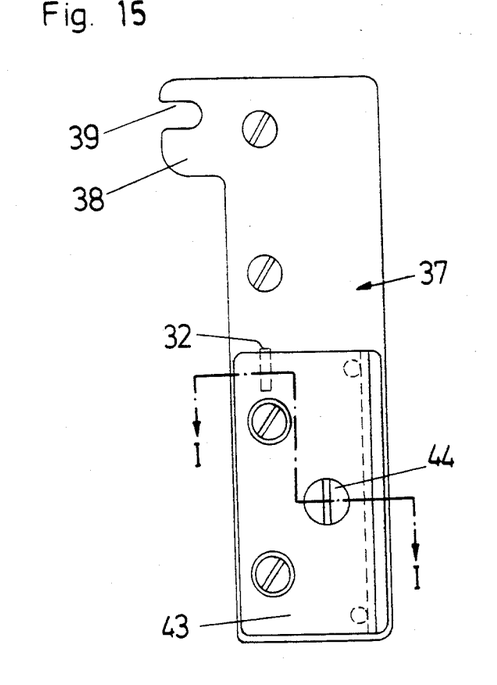
FIGS. 15 and 17 to 19 are elevations of various fastening plates for securing the rear wall of the drawer to the drawer side.
Figure 16:
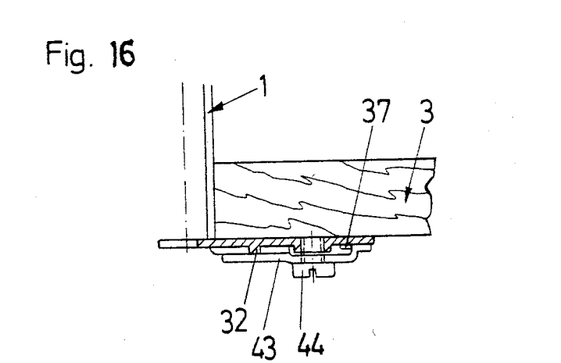
FIG. 16 is a section along line I—I of FIG. 15.
Figure 17:
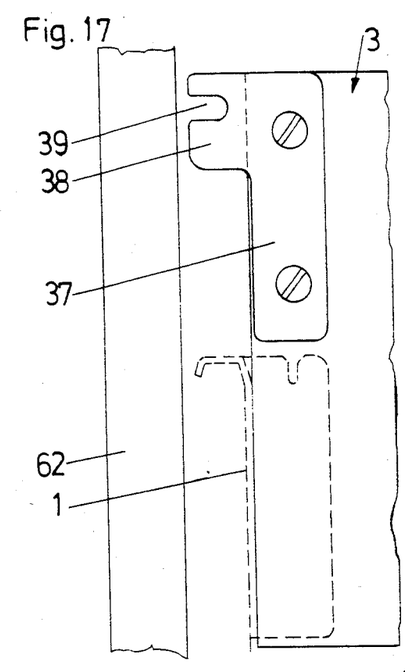
Figure 18:
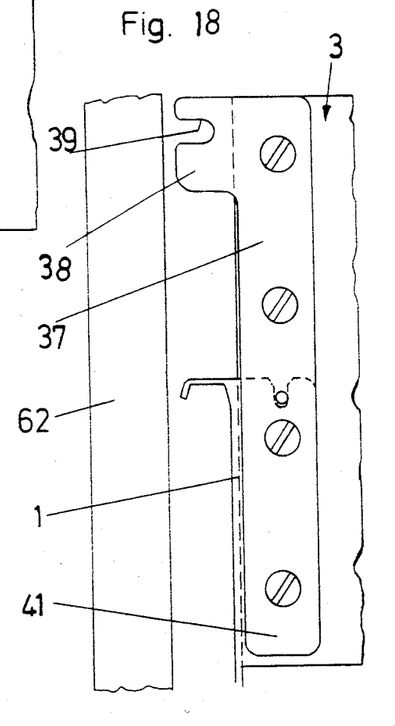
Figure 19:
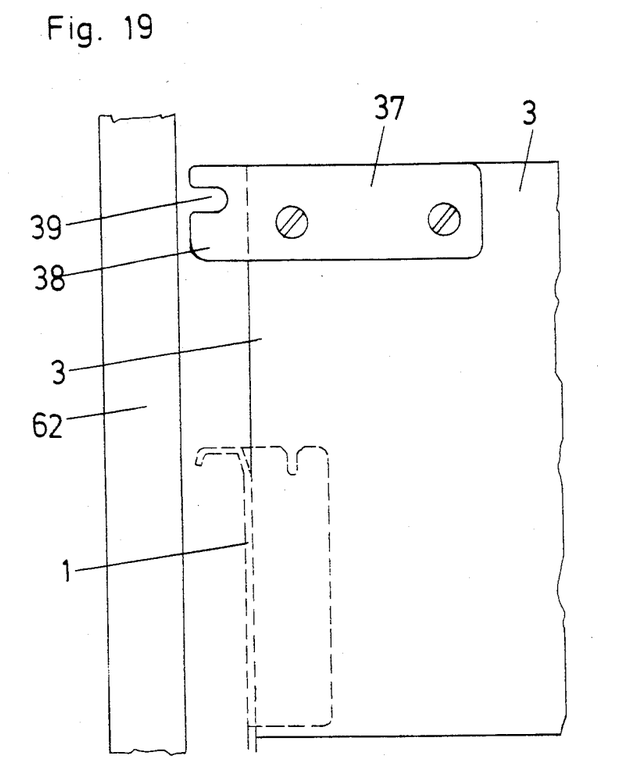

In the embodiment according to FIGS. 15 and 16, a clamping plate 43 is provided instead of the plate 41. The clamping plate 43 can be firmly clamped by means of a screw 44 which extends into the holding plate 37. In this embodiment the holding plate 37 is provided with the positioning web 32. FIGS. 17 and 19 are similar to the embodiments of FIGS. 10 and 11, respectively. FIG. 18 is an elevation of an embodiment similar to FIG. 13, but with a pin fitting into a slot in the top of a plate extending from side 1.

The side wall of the piece of furniture is indicated by reference numeral 62 in FIGS. 17–19.

We claim:

1. A fitting assembly for connecting the rear end of a side wall of a drawer to the respective end of a rear wall of the drawer, said assembly comprising:
   a fastening plate to extend inwardly from the rear end of the drawer side wall at a right angle thereto, said fastening plate having in an upper edge thereof an open-ended slot, said fastening plate having therethrough a keyhole-shaped opening, and said fastening plate including fastening means for use in connecting said fastening plate to a rear side of the drawer rear wall; and
   holding means, to be connected to the rear side of the drawer rear wall, for cooperation with at least said open-ended slot of said fastening plate for clamping said fastening plate to the rear side of the drawer rear wall, said holding means comprising a plate to be connected to the rear side of the drawer rear wall at a position spaced rearwardly therefrom to define a gap therebetween, such that said fastening plate may be inserted relatively upwardly into the gap, said plate having extending forwardly therefrom a tap to fit within said open-ended slot in said fastening plate.

2. An assembly as claimed in claim 1, wherein said fastening means comprises at least one hole through said fastening plate, and wherein said holding means further comprises screw means fitting through said at least one hole for tightening said fastening plate against the rear side of the drawer rear wall.

3. An assembly as claimed in claim 1, wherein said fastening means comprises dowels extending from said fastening plate to fit into holes in the rear side of the drawer rear wall.

4. An assembly as claimed in claim 1, wherein said plate further includes a nose that hooks into said keyhole-shaped opening when said fastening plate is inserted into the gap.

5. An assembly as claimed in claim 1, wherein said fastening means comprises at least one hole through said fastening plate, said plate has therethrough at least one hole to align with said hole in said fastening plate when said fastening plate is inserted in the gap, and screw means extending through said hole in said plate and said hole in said fastening plate into the rear side of the drawer rear wall for clamping said plate and said fastening plate toward the rear side of the drawer rear wall.

6. An assembly as claimed in claim 1, further comprising a rail plate to be mounted on the rear side of the drawer rear wall for supporting the rear end of a side rail of the drawer.

7. An assembly as claimed in claim 6, wherein said plate is formed integrally with and extends from said rail plate.

8. An assembly as claimed in claim 6, wherein said plate is connected to and extends from said rail plate.

9. An assembly as claimed in claim 6, wherein said plate is clamped toward said rail plate.

10. An assembly as claimed in claim 1, wherein said plate is resilient.

11. An assembly as claimed in claim 1, wherein said fastening plate is formed integrally with the drawer side wall of metal.

12. An assembly as claimed in claim 1, wherein the drawer side wall is formed of metal, and said fastening plate is formed of metal and is secured to the drawer side wall.

13. An assembly as claimed in claim 12, wherein said fastening plate includes a rearwardly extending portion having mounted thereon a drawer roller.

* * * * *